United States Patent [19]

Tessler

[11] 4,086,419

[45] Apr. 25, 1978

[54] PREPARATION OF STARCH SULFATE ESTERS

[75] Inventor: Martin M. Tessler, Edison, N.J.

[73] Assignee: National Starch and Chemical Corporation, Bridgewater, N.J.

[21] Appl. No.: 660,911

[22] Filed: Feb. 24, 1976

[51] Int. Cl.$^2$ .............................................. C08B 31/02
[52] U.S. Cl. ..................................... 536/107; 536/105
[58] Field of Search ................................ 536/107, 105

[56] References Cited

U.S. PATENT DOCUMENTS

| | | | |
|---|---|---|---|
| 2,686,779 | 8/1954 | Jones | 536/107 |
| 3,271,388 | 9/1966 | Cammarata et al. | 536/107 |

OTHER PUBLICATIONS

Handbook of Chemistry and Physics, 47th Edition, (1966–1967), p. B-224, The Chemical Rubber Co., Cleveland, Ohio.

Primary Examiner—Melvyn I. Marquis
Attorney, Agent, or Firm—Edwin Szala; Ellen T. Dec

[57] ABSTRACT

Aqueous slurries or dispersions of starch are reacted with ammonium fluorosulfate or an alkali metal fluorosulfate to yield starch sulfate esters. The inorganic by-products produced in the reaction are readily removed by washing or dialysis. These starch products may also be prepared in non-aqueous solvents or by a dry reaction process.

8 Claims, No Drawings

PREPARATION OF STARCH SULFATE ESTERS

BACKGROUND OF THE INVENTION

I. Field of the Invention

This invention relates to a novel method for the preparation of starch sulfate esters. More particularly, the invention relates to a method for the preparation of starch sulfate esters by the reaction of an inorganic fluorosulfate reagent with a starch base under specified reaction conditions.

II. Brief Description of the Prior Art

The modification of starch by chemical derivatization is well known and documented in such sources as "Starch And Its Derivatives," by J. S. Radley (1968) Fourth Edition, published by Chapman and Hall, Ltd. London. More particularly, the prior art teaches the preparation of starch sulfate esters in water by the reaction of organic reagents with starch bases. The methods of the prior art therefore result in the production of organic by-products which are difficult to remove properly from the reaction mixture. Specifically, it is well known to use trimethylamine-sulfur trioxide complex to produce starch sulfate esters. However the by-product, trimethylamine, resulting from the reaction is very difficult to completely remove from the final starch ester.

It is therefore an object of this invention to provide a convenient and economical method for preparing starch sulfate esters. It is also an object of the invention to provide a method for the preparation of starch sulfate esters in water which results in the production of inorganic by-products which may be readily removed. Other objects of the invention will be apparent from the following description.

SUMMARY OF THE INVENTION

The above and related objects are accomplished by reacting a selected starch base with ammonium fluorosulfate or an alkali metal fluorosulfate. The starch modification is preferably carried out under controlled conditions in an aqueous, alkaline medium.

The resulting starch sulfate esters, which contain trace amounts of inhibition are characterized by their greater stability, clearer cooks, their ability to form cooked pastes which are more resistant to gelling upon cooling, and their lowered gelatinization temperatures, as compared to the corresponding untreated starches. These properties permit the derivatives to be utilized in a number of applications including as sizings, coatings, thickeners for foods, adhesives, etc. depending upon their degree of substitution.

DESCRIPTION OF THE PREFERRED EMBODIMENTS

The starch base materials which may be used in preparing the starch sulfate esters of the invention may be derived from any plant source including corn, potato, sweet potato, wheat, rice, sago, tapioca, waxy maize, sorghum, high amylose corn or the like. Also included are the conversion products derived from any of the latter bases including, for example, dextrines prepared by the hydrolytic action of acid and/or heat; oxidized starches prepared by treatment with oxidants such as sodium hypochlorite; derivatized starches such as starch ethers and esters; and fluidity or thin boiling starches prepared by enzyme conversion or by mild acid hydrolysis. The use of the term "starch base" is thus seen to include any amylaceous substance, whether untreated or chemically modified, which, however still retains free hydroxyl groups capable of entering into the esterification reaction of this invention. If the desired product is to be granular starch, then obviously the initial starting material must be in granular form. It is to be noted, however, that the method of this invention may also be carried out employing gelatinized starches which will result in the production of non-granular, starch esters.

The fluorosulfate reagent employed herein may be ammonium fluorosulfate or an alkali metal fluorosulfate. Preferably, ammonium, sodium or potassium fluorosulfates are employed. The preparation of these reagents is known and described in the literature. Ammonium fluorosulfate is produced by reacting ammonium fluoride with sulfur trioxide. Alkali metal salts are generally prepared from the ammonium salt by evaporating a solution containing the ammonium salt with an alkali metal hydroxide.

I have also found that fluorosulfate reagents suitable for use herein can be prepared by neutralizing fluorosulfonic acid with aqueous solutions of the ammonium or alkali metal base. If this preparative procedure is used, the temperature is maintained below about 40° C., and preferably below about 15° C. in order to minimize hydrolysis of the fluorosulfate anion. The concentration of aqueous alkali metal hydroxide used to neutralize the fluorosulfonic acid is about 10 to 50% by weight, and preferably 15-20% by weight. As an example, sodium fluorosulfate may be prepared by neutralizing fluorosulfonic acid with excess sodium hydroxide preferably with cooling. If the latter method is employed, the resulting aqueous solution may be used directly in the reaction with starch. Alternatively, the solution containing the fluorosulfate reagent can be concentrated to near-dryness, oven dried and used in the reaction in the form of the corresponding dry salt. In another modification of this embodiment, fluorosulfonic acid can be neutralized "in situ" in a starch dispersion with aqueous alkali metal hydroxide. Normally, concentrations of 10 to 50%, by weight of aqueous alkali metal hydroxides are used with temperatures of 20° to 70° C. and pH values within the range required for the starch reaction.

The novel method of this invention comprises reacting the fluorosulfate reagent with a starch base which is suspended or dispersed in water. The reaction is carried out at temperatures of from about 30° to 90° C. The preferred temperature at which a granular starch esterification is carried out is from 45°–55° C. and that for a non-granular starch esterification is from 45°–70° C. It will be recognized by the practitioner that use of temperatures above about 60° C. with granular starches will result in granule swelling and filtration difficulties or gelatinization of the starch.

The pH of the reaction mixture is ordinarily controlled so as to be above 11.2 but below 13.0, with the preferred range being about 11.5 to 12.5. The pH is conveniently controlled by the periodic addition of a dilute aqueous solution of sodium hydroxide or other common base including potassium hydroxide, sodium and potassium carbonate, tetramethylammonium hydroxide, etc. Alternately, the pH is not controlled but an excess of the base is added initially to maintain the required alkaline pH.

It is preferred in any embodiment of the invention, but particularly when granular starches are employed, to carry out the reaction in the presence of sodium sulfate in amounts of from about 15 to 50% by weight of dry starch. At pH values below about 11.5, sodium sulfate is employed in order to obtain reasonable reaction efficiencies. At pH values above about 11.7, the presence of sodium sulfate acts to suppress swelling of the starch and gives a more filterable product.

Aqueous suspensions are preferred, but the reaction may be carried out, if desired, in a non-aqueous system by suspending the starch base in any common organic solvent as, for example, p-dioxane, toluene, dichloromethane and the like, then adding the sodium fluorosulfate, and reacting at 40°–150° C. for 0.2 to 24 hours.

The amount of fluorosulfate reagent employed in the reaction with the starch base will vary from about 1 to 125% based on the weight of dry starch, depending on such factors as the starch base employed, the degree of stabilization required in the end product, and the particular reagent employed.

Reaction time will vary from about 0.2 to 24 hours depending on such factors as the reactivity and amount of the reagent used, the temperature and pH employed, etc. After completion of the reaction, the pH of the reaction mixture is preferably adjusted to a pH of from 3.0 to 7.0 with any common acid such as hydrochloric acid, sulfuric acid, acetic acid, etc.

Recovery of the resulting starch may be readily accomplished with the particular method employed being dependent upon the form of the starch base. Thus, a granular starch product is recovered by filtration, washed free of residual salts with water and dried. Alternatively, the washed product may be drum dried, or spray dried, or gelatinized and isolated by alcohol precipitation or freeze drying. If the starch product is non-granular, it can be purified by dialysis to remove residual salts and isolated by alcohol precipitation, freeze drying, or spray drying.

If desired, the starch sulfate esters of this invention may also be prepared by means of a dry process. In carrying out a typical dry procedure, the fluorosulfate reagent is added to an aqueous slurry of the starch base. The pH of the resulting mixture is adjusted to between 8.0 and 12.0. The mixture is stirred, and the thusly treated starch is recovered by filtration and then dried to a moisture content of about 35% by weight or less, by any suitable conventional method. The dried treated starch is thereafter heated (as by placing in an oven) at temperatures of about 40° to 150° C., preferably 60° to 110° C. The reaction period, i.e. heating time will vary according to the reaction temperature and selected starch base and reagent employed. Generally lower temperatures will require longer reaction times. Reaction periods of about 1 to 6 hours have been found to be sufficient in most instances. At the end of the reaction period, the treated starch is allowed to cool. If removal of any residual salts and by-products is desired, the starch is then slurried in water, the slurry pH adjusted to about 3–7 and the starch product is recovered from the slurry by filtration, washing and isolation as previously described.

It can be appreciated by the practitioner that a large number of variations may be effected in reacting the starch base with fluorosulfate reagent in accordance with the reaction procedure described above without materially departing from the scope and spirit of the invention. Such variations will be evident to those skilled in the art.

The reaction to produce the starch sulfate esters is illustrated by the following schematic equation in which StOH represents the starch molecule and sodium fluorosulfate is used as the reagent:

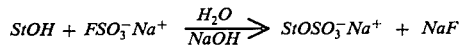

The practitioner will recognize that the starch molecule is a polymer of glucose and contains three free hydroxyl groups per anhydroglucose unit in the polymer. (The non-reducing end glucose units contain four free hydroxyl groups.) Each of these hydroxyl groups can react as described in the equation. It is also known that the relative reactivity of each of the hydroxyl groups is not equivalent, some being more reactive than others, and that many hydroxyl groups from the same starch molecule will react to give the products of this invention.

The starch products of this invention normally contain trace amounts of cross-linking. The mechanism of inhibition is not known with certainty, but it probably involves the formation of diesters of structure:

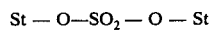

The amount of crosslinking (inhibition) will depend on the reaction temperature, reaction pH and the amount of reagent, and is measured by performing a sediment volume test. In this procedure, an aqueous suspension of the inhibited product having a concentration of 1% by weight, solids is cooked on a boiling water bath for about 30 minutes at pH 7.0. The resulting dispersion is then allowed to stand in a graduated vessel, such as a 100 ml. graduated cylinder, at room temperature for a period of about 16 hours. The cooked product will separate into layers on the basis of relative inhibition. In extreme cases, it will completely settle out with the sediment so formed occupying different volumes depending on the degree of inhibition of the reaction product. These sediments are composed of insoluble granules of the starch derivative whose swollen volumes are relative to the degree of inhibition of the derivatives. Thus, because of their lower swelling and hydration capacity, the more inhibited, i.e, the more cross-linked products will yield similar sediment volumes than correspondingly less inhibited products. Where, however, the original starch base exhibits no sediment formation because of the completely swollen, highly hydrated and/or disrupted nature of its granules, e.g., in the case of waxy maize starch, inhibition in the product will be evidenced by the subsequent formation of sediment. The result is directly attributable to the toughened state of the cross-linked granules.

The starch ester products containing trace amounts of inhibition prepared by the process of this invention are characterized by the stability of their dispersions. Thus, the cooked pastes derived from water dispersible corn starch ester products display improved clarity and resistance to gelling on cooling. This highly desired property permits the derivatives of this invention to be widely utilized as, for example, the sizing of paper and textiles, and in foods. Another characteristic of the starch sulfate esters of the invention is a lowered gelatinization temperature as opposed to untreated starches. It is to be noted that increasing amounts of inhibition will result in a decrease in clarity and viscosity. Large amounts of inhibition will yield a non-dispersible starch product.

In the following examples, which illustrate the practice of the invention, all parts given are by weight unless otherwise specified.

EXAMPLE I

This example illustrates the use of sodium fluorosulfate in preparing the starch esters of this invention.

A total of 5.0 parts fluorosulfonic acid was slowly added to 25.0 parts of 10%, by weight, aqueous sodium hydroxide with good agitation. The temperature was maintained below 35° C. by cooling with an ice bath, and the pH was controlled between 11–12 by periodically adding additional 10% sodium hydroxide (a total of 13.3 parts was required). After addition of fluorosulfonic acid was complete, the reaction mixture was sitrred at room temperature for about 20 minutes and the pH was then lowered to 11.0 with 10% aqueous hydrochloric acid.

A total of 50.0 parts corn starch was added to a solution of 1.5 parts sodium hydroxide and 15.0 parts sodium sulfate in 62.5 parts water. The solution of sodium fluorosulfate described above was then added, and the resulting starch slurry agitated at 40° C. for 16 hours. The pH was then lowered to 5.5 by adding 10% aqueous hydrochloric acid and the starch product isolated by filtration, washed with water, and dried. The resulting starch sulfate derivative contained 0.24% sulfur, by weight.

The procedure used to determine the sulfur content of the starch derivatives comprised washing the starch with water by resuspension at least six times, hydrolyzing the starch ester by refluxing with hydrochloric acid for 4 hours, cooling filtering, and precipitating sulfate from the boiling filtrate by adding a slight excess of barium chloride solution. The amount of precipitated barium sulfate was determined gravimetrically after washing with distilled water until a negative chloride test was obtained with silver nitrate solution.

EXAMPLE II

This example illustrates additional preparations of starch sulfate esters, in accordance with this invention, employing varied reaction conditions.

Reagent Preparation

Method A: 85.0 Parts fluorosulfonic acid was added dropwise to 340.0 parts 20% aqueous sodium hydroxide with cooling to maintain the temperature below 30° C. After addition was complete, the mixture was stirred at room temperature for about 1 hour. Some insoluble solids formed after the neutralization of the fluorosulfonic acid and the entire mixture (solids plus aqueous solution) was used in subsequent starch reactions.

Method B: 105.0 Parts fluorosulfonic acid was slowly added to 525.0 parts 10% aqueous sodium hydroxide with cooling to maintain temperature below 35° C. When the pH decreased below 11.0, additional 10% sodium hydroxide was added to maintain pH between 11 and 12. A total of 211.1 parts additional 10% aqueous sodium hydroxide was required. After addition was complete, and pH constant, the mixture was stirred at room temperature for about 30 minutes. The resultant mixture was used in subsequent starch reactions.

Method C: 30.0 parts fluorosulfonic acid was slowly added to 50.0 parts distilled water while controlling the pH at 12.0 by adding 15% aqueous sodium hydroxide as required, and cooling to maintain temperature below 15° C. A total of 141.0 parts 15% sodium hydroxide was required to maintain the pH at 12.0. After addition was complete and pH constant, the mixture was stirred for about one hour at room temperature. The resultant mixture was used in subsequent starch reactions.

Starch Reactions

In preparing these derivatives (see Table I), the basic procedure which was followed comprised the suspension of 100 parts of the respective starch bases in 125.0 to 150.0 parts water which contained 30.0 parts sodium sulfate and 3.0 parts sodium hydroxide. An aqueous solution of sodium fluorosulfate prepared from the amount of fluorosulfonic acid indicated in Table I was added and the resulting suspension agitated for the desired time at the indicated temperature. At the end of the reaction, the pH was lowered to 5.0 – 6.0, the starch isolated by filtration, washed with water, and dried. Each reacted starch was examined for sulfur content by the method described in Example I.

EXAMPLE III

This example illustrates the preparation of additional starch sulfate esters in accordance with this invention employing varied reaction pH's.

Sample A: A total of 30 parts waxy maize starch which had been acid - converted to a degree known in the trade as 50 fluidity was added to a mixture of 25 parts water and 20.0 parts of an aqueous solution of sodium fluorosulfate prepared from 2.8 parts fluorosulfuric acid by method C described in Example II. The temperature was raised 40° C. and the pH increased to 11.8 by adding 3.0% aqueous sodium hydroxide. The starch slurry was agitated at 40° C. for 16 hours while controlling the pH at 11.8 by periodically adding 3.0% aqueous sodium hydroxide. At the end of the reaction, the pH was lowered to 5.5 with 10.0% aqueous hydrochloric acid, the starch product recovered by filtration, washed with water, and dried. The resulting starch sulfate ester contained 0.15% sulfur, by weight.

TABLE I

| Derivative Number | Starch Base | Reagent Preparation % HFSO$_3$ on Starch | Method | Starch Reaction Temperature (20° C.) | Time (Hours) | % Sulfur |
| --- | --- | --- | --- | --- | --- | --- |
| 1 | Waxy maize | 7.0 | A | 50 | 16 | 0.37 |
| 2 | Waxy maize (acid converted to 50 fluidity) | 10.0 | B | 52 | 16 | 0.21 |
| 3 | High amylose corn starch (70% amylose by weight) | 10.0 | B | 52 | 16 | 0.22 |
| 4 | High amylose corn starch (50% amylose by weight) | 10.0 | B | 52 | 16 | 0.31 |
| 5 | Corn starch previously treated with 3.0% diethylaminoethyl chloride hydrochloride | 10.0 | B | 45 | 16 | 0.24 |
| 6 | Corn | 7.0 | A | 40 | 3 | 0.04 |
| 7 | Corn | 7.0 | A | 40 | 8 | 0.08 |
| 8 | Waxy maize previously treated with | 10.2 | A | 40 | 16 | 0.13 |

TABLE I-continued

| Derivative Number | Starch Base | Reagent Preparation | | Starch Reaction | | |
|---|---|---|---|---|---|---|
| | | % HFSO$_3$ on Starch | Method | Temperature (20° C.) | Time (Hours) | % Sulfur |
| | 7.0% propylene oxide and 0.02% phosphorous oxychloride | | | | | |
| 9 | Tapioca | 10.2 | A | 40 | 16 | 0.20 |
| 10 | Corn starch (oxidized by reaction with NaOCl to 50 fluidity) | 10.2 | A | 40 | 16 | 0.24 |
| 11 | Corn | 7.2 | A | 30 | 16 | 0.11 |
| 12 | Waxy maize (acid converted to 50 fluidity) | 2.0 | C | 40 | 16 | 0.05 |

Sample B: The procedureal steps of A above were repeated except the reaction pH was lowered to 11.4. The resulting starch sulfate ester contained 0.03% sulfur, by weight.

Sample C: The procedural steps of B above were repeated except that the starch was waxy maize, 9.0 parts sodium sulfate were dissolved in the reaction mixture and the temperature was increased to 50° C. The resulting starch sulfate ester contained 0.17% sulfur, by weight.

EXAMPLE IV

This example illustrates the preparation and use of dry salts of sodium fluorosulfate in preparing the starch sulfate esters in accordance with this invention.

Reagent preparation

A total of 100.0 parts fluorosulfonic acid was slowly added to 125 parts distilled water while controlling the pH at 12.0 by adding 15% aqueous sodium hydroxide as required, and also cooling to maintain the temperature below 15° C. A total of 453.0 parts of 15% aqueous sodium hydroxide was required to maintain the pH at 12.0. The aqueous solution was concentrated to almost dryness using a rotary evaporator at 30° C./12.5 mm. and then cooled to about 5° C. The resulting solids were recovered by filtration and dried by heating in an oven at 48° C. for 24 hours.

Starch Reaction

A total of 30 parts corn starch was added to a solution of 0.9 parts sodium hydroxide and 9.0 parts sodium sulfate in 40 parts water and then 3.0 parts of the dry reagent prepared above was added. The starch slurry was agitated at 40° C. for 17 hours, the pH lowered to 5.5 with 9.5% aqueous hydrochloric acid, the starch product recovered by filtration, washed with water, and dried. The resulting starch sulfate ester contained 0.22% sulfur, by weight.

EXAMPLE V

This example illustrates the preparation of a starch sulfate ester using a gelatinized starch base.

A total of 85.0 parts fluorosulfonic acid was added slowly to 340.0 parts of 20%, by weight, aqueous sodium hydroxide while cooling to maintain temperature below 25° C.

A total of 30.0 parts of waxy maize starch which had been acid converted to a degree known in the trade as 85 fluidity was added to 30 parts water and the suspension cooked in a boiling water bath for 10 minutes. The pH was then raised to 12.0 by adding 50% aqueous sodium hydroxide. The resulting starch dispersion was cooled to 40° C. and 143.7 parts of the aqueous sodium fluorosulfate solution prepared above was added. The mixture was agitated for 16 hours at 40° C. while controlling the pH at 12.0 by periodically adding 15% sodium hydroxide. Following the reaction period, the pH was lowered to 5.0 by the addition of 9.5% hydrochloric acid solution. The starch product thus obtained was purified by dialysis for 24 hours and isolated by precipitation from ethyl alcohol. Analysis of the starch sulfate ester indicated it contained 2.6% by weight of sulfur.

EXAMPLE VI

This example illustrates the preparation of non-granular starch sulfate esters of this invention at high temperature.

A total of 100 parts fluorosulfonic acid was added dropwise to 125 parts distilled water while controlling the pH at 12.0 by periodically adding 15% sodium hydroxide and cooling to maintain the temperature below 15° C. A total of 453 parts 15% sodium hydroxide was required to maintain the pH. After addition was complete and pH constant, the mixture was stirred for about 1 hour.

A total of 30 parts waxy maize (85 fluidity as used in Ex V) was added to 30 parts water, the pH raised to 12.0 with 50% aqueous sodium hydroxide and the mixture heated in a boiling water bath for 10 minutes. The resulting dispersion was cooled to 73° C. and 67.4 parts of the aqueous solution of sodium fluorosulfate prepared above was added. The dispersion was stirred at 73° C. for 16 hours while controlling the pH at 12.0 with 15% aqueous sodium hydroxide. Following the reaction period, the dispersion was cooled to about 25° C. and the pH lowered to 5.5 with 9.5% hydrochloric acid. The starch product was purified by dialysis for 48 hours and isolated by precipitation from ethyl alcohol. Analysis of the starch sulfate ester indicated it contained 3.7% sulfur.

EXAMPLE VII

This example illustrates a number of embodiments of this invention utilizing a dry reaction procedure.

I. A total of 50 parts corn starch was added to a mixture of 14 parts water and 51.3 parts of an aqueous solution of sodium fluorosulfate (prepared from 7.5 parts fluorosulfonic acid by method C of Example II). The pH was adjusted to 9.5, the starch slurry agitated for 5 minutes, and the starch recovered by filtration. The starch was then placed in an oven and heated at 100° C. for 4 hours. The starch product was purified by resuspending in water, lowering the pH to 5.5 with 9.5% aqueous hydrochloric acid, filtering, washing with water and drying. The resulting starch sulfate ester contained 0.22% sulfur, by weight.

II. The above reaction was repeated in the identical manner except the pH was adjusted to 11.4 before the dry reaction. The resulting starch sulfate ester contained 0.37% sulfur, by weight.

III. The above reaction was repeated three times in an identical manner except that the pH of the starch slurry before filtration was 9.5, 10.8 and 11.4 and the dry starch mixtures were heated at 150° C. for 3 hours. The products were purified by dialysis until a negative sulfate test was obtained, recovered by precipitation from ethanol and dried. Upon analysis, they were found to contain 0.59, 0.60 and 0.60% sulfur, respectively.

IV. The above reaction was repeated in an identical manner as part I at pH 11.4, except that the dry starch was heated at 38° C. for 16 hours. The resulting starch sulfate ester was found to contain 0.03% sulfur, by weight.

EXAMPLE VIII

This example illustrates the preparation of starch sulfate esters according to this invention utilizing a number of variations in which non-aqueous solvent systems are employed.

I. A total of 30 parts corn starch, 3 parts sodium carbonate, and 3 parts dry sodium fluorosulfate reagent prepared in Example IV were added to 100 parts ethyl acetate. The resulting mixture was refluxed for 16 hours, cooled, and filtered. The starch product was purified by suspending in water, lowering the pH to 5.5 with 10% aqueous hydrochloric acid, filtering, washing with water, and drying. The resulting starch sulfate ester contained 0.20% sulfur.

To further evaluate the effectiveness of the sulfating reagent on the starch base a sample of the starch sulfate ester was tested as follows:

A suspension comprising 8 parts starch product and 96 parts water and having a pH of 7.0 was cooked by means of a boiling water bath at 100° C. for 20 minutes. Upon cooling to room temperature (about 22° C.) and standing for 20 hours, it was observed that the resulting dispersion was very viscous, cohesive, relatively clear and stable when compared to a corn starch control.

II. A total of 30 parts corn starch, 3 parts sodium carbonate, and 3 parts dry ammonium fluorosulfate were added to 88 parts benzene. The resulting mixture was refluxed (80.1° C.) for 17 hours, cooled, and filtered. The starch product was purified by suspending in 40 parts water, lowering the pH to 6.5 with 10% aqueous hydrochloric acid, filtering, washing two times with 50% by volume aqueous ethanol, two times with water and once with acetone. Filtration from an aqueous slurry was very slow. When evaluated by the cook procedure described above, the resulting dispersion was very viscous, very cohesive and relatively clear and stable when compared to a corn starch control.

EXAMPLE IX

This example illustrates the preparation and use of potassium fluorosulfate in preparing the starch sulfate esters of this invention.

A total of 3.0 parts fluorosulfonic acid was slowly added to 10 parts distilled water. The temperature was maintained at 10° C. by cooling with an ice bath and the pH maintained between 11-12 by periodically adding 10% aqueous potassium hydroxide. After addition of fluorosulfonic acid was complete, the solution was stirred at room temperature for about 15 minutes. Then 0.9 parts of potassium hydroxide, and 9.0 parts sodium sulfate were dissolved in the solution and 30 parts corn starch added. The resulting slurry was agitated at 40° C. for 16 hours, the pH lowered to 3.0 with 9.5% aqueous hydrochloric acid and the starch product recovered by filtration, washed with water and dried.

The resulting starch sulfate derivative contained 0.26% sulfur, by weight.

EXAMPLE X

This example illustrates the preparation of starch sulfate esters of this invention wherein fluorosulfonic acid is added directly to a starch dispersion and neutralized therein.

A total of 100 parts waxy maize starch which had been acid converted to a degree known in the trade as 85 fluidity was dispersed in 100 parts water by heating in a boiling water bath for 10 minutes. The resulting dispersion was cooled to about 55° C. and the pH raised to 12.0 with 25% aqueous sodium hydroxide. Then 100 parts of fluorosulfonic acid was slowly added while maintaining the pH at 12.0 by periodically adding 25% aqueous sodium hydroxide. The reaction mixture was agitated for about 20 hours at 55° C. and controlled pH 12.0. Thereafter the pH was lowered to 7.0 with 9.5% aqueous hydrochloric acid, the starch dispersion purified by dialysis for about 48 hours (until sulfate test was negative), and the starch sulfate ester isolated by freeze drying. Analysis of the purified starch product indicated it contained 4.2% sulfur, by weight.

Variations may be made in materials, proportions and procedures without departing from the scope of this invention as defined by the following claims.

I claim:

1. A process for preparing sulfate esters of starch comprising the steps of:
    a. reacting a starch having free reactive hydroxyl groups with a fluorosulfate reagent selected from the group consisting of ammonium fluorosulfate and alkali metal fluorosulfates, wherein the amount of the reagent employed is 1 to 125%, based on the weight of dry starch, and the reaction is carried out in an aqueous medium at a pH of 11.2 to 13.0 and at a temperature of about 30° to 90° C. for a period of from 0.2 to 24 hours; and
    b. isolating the resultant starch sulfate ester.

2. A process according to claim 1 wherein a granular starch is reacted with the fluorosulfate reagent in an aqueous medium at pH 11.5 to 12.5 and at a temperature of about 45° to 55° C. for a period of from 0.2 to 24 hours.

3. A process according to claim 1 wherein a nongranular starch is reacted with the fluorosulfate reagent in an aqueous medium at a pH of 11.5 to 12.5 and at a temperature of about 45° to 70° C. for a period of from 0.2 to 24 hours.

4. A process according to claim 1 wherein the starch is corn starch or waxy maize starch.

5. A process according to claim 1 wherein said fluorosulfate reagent is a member of the group consisting of ammonium fluorosulfate, sodium fluorosulfate and potassium fluorosulfate.

6. A process according to claim 1 wherein there is additionally present in the reaction mixture from 15 to 50% by weight of the starch, of sodium sulfate.

7. A process according to claim 1 wherein the fluorosulfate reagent is product in situ in the starch dispersion by the neutralization of fluorosulfonic acid with excess alkali metal hydroxide.

8. A process for preparing sulfate esters of starch comprising the steps of:

(a) forming an aqueous slurry of starch having free reactive hydroxyl groups;
(b) admixing therewith a fluorosulfate reagent selected from the group consisting of ammonium fluorosulfate and alkali metal fluorosulfate wherein the amount of reagent employed is 1 to 125%, based on the weight of dry starch;
(c) adjusting the pH of the resulting aqueous mixture to between 8.0 and 12.0;
(d) drying to a moisture content of about 35% by weight or less, based on the weight of the starch;
(e) heating at a temperature of about 40° to 150° C. for a period of 1 to 6 hours; and
(f) isolating the resultant starch sulfate ester.

* * * * *

UNITED STATES PATENT OFFICE
CERTIFICATE OF CORRECTION

Patent No. 4,086,419　　　　　　　　　Dated April 25, 1978

Inventor(s) Martin M. Tessler

It is certified that error appears in the above-identified patent and that said Letters Patent are hereby corrected as shown below:

Col. 5, line 33, insert a comma after "cooling".

Col. 6, Table I, in the column headed "Temperature", change the designation "(20°C.)" to read -- (°C.) --.

Signed and Sealed this

Eighth Day of August 1978

[SEAL]

Attest:

RUTH C. MASON
Attesting Officer

DONALD W. BANNER
Commissioner of Patents and Trademarks